(12) United States Patent
Guérin et al.

(10) Patent No.: US 6,841,623 B2
(45) Date of Patent: Jan. 11, 2005

(54) LOW MOLECULAR WEIGHT NITRILE RUBBER

(75) Inventors: Frédéric Guérin, Petrolia (CA); Sharon X. Guo, Stratford (CA)

(73) Assignee: Bayer Inc., Toronto (CA)

( * ) Notice: Subject to any disclaimer, the term of this patent is extended or adjusted under 35 U.S.C. 154(b) by 218 days.

(21) Appl. No.: 10/167,139

(22) Filed: Jun. 10, 2002

(65) Prior Publication Data

US 2003/0027958 A1 Feb. 6, 2003

(30) Foreign Application Priority Data

Jun. 29, 2001 (CA) .............................................. 2351961
Sep. 18, 2001 (CA) .............................................. 2357470

(51) Int. Cl.$^7$ ........................... C08L 33/18; C08F 20/42; C08F 4/70
(52) U.S. Cl. ....................... 525/230; 525/233; 525/245; 525/294; 526/171; 526/335; 526/341; 526/348.5
(58) Field of Search ................................ 525/230, 233, 525/245, 294; 526/171, 335, 341, 348.5

(56) References Cited

U.S. PATENT DOCUMENTS

| | | | |
|---|---|---|---|
| 5,446,102 A | 8/1995 | Oziomek et al. | ........... 525/245 |
| 6,673,881 B2 * | 1/2004 | Guerin | ....................... 526/160 |

* cited by examiner

*Primary Examiner*—James J. Seidleck
*Assistant Examiner*—Olga Asinovsky
(74) *Attorney, Agent, or Firm*—Jennifer R. Seng; Godfried R. Akorli

(57) ABSTRACT

The present invention relates to nitrile rubber polymers having lower molecular weights and narrower molecular weight distributions than those known in the art. The present invention also relates to a process for the manufacture of said nitrile rubber and the use of said nitrile rubber for the manufacture of shaped articles.

7 Claims, 1 Drawing Sheet

LOW MOLECULAR WEIGHT NITRILE RUBBER

FIELD OF THE INVENTION

The present invention relates to nitrile rubber polymers having lower molecular weights and narrower molecular weight distributions than those known in the art and a process for its manufacture.

BACKGROUND OF THE INVENTION

Nitrile rubber (NBR), a co-polymer comprising at least one conjugated diene, at least one unsaturated nitrile and optionally further comonomers, is a specialty rubber, which has good chemical resistance, and excellent oil resistance. Coupled with the high level of mechanical properties of the rubber (in particular the high resistance to abrasion) it is not surprising that NBR has found widespread use in the automotive (seals, hoses, bearing pads), electrical (cable sheathing), mechanical engineering (wheels, rollers) and footwear industries, amongst others.

Commercially available NBR is manufacture by emulsion polymerization. The monomers are emulsified in water, a free radical-generating catalyst is added and the mixture is agitated whilst a constant temperature is maintained. After the desired degree of polymerization is reached, a shortstop and stabilizers are added to the reaction system causing termination of the polymerization process. Generally, NBR obtained by this process has a Mooney viscosity in the range of from 30 to 90, an Mw in the range of from 250,000 to 350,000, an Mn in the range of from 80,000 to 150,000 and a polydispersity index greater than 3.2.

In addition, so-called "liquid NBR" having a very low Mooney viscosity and a low molecular weight can be produced be adding the shortstop agent early in the reaction process. As in the case of regular NBR, the resulting liquid NBR has a polydispersity greater than 3.0.

Figure 1:

Karl Ziegler's discovery of the high effectiveness of certain metal salts, in combination with main group alkylating agents, to promote olefin polymerization under mild conditions has had a significant impact on chemical research and production to date. It was discovered early on that some "Ziegler-type" catalysts not only promote the proposed coordination-insertion mechanism but also effect an entirely different chemical process, that is the mutual exchange (or metathesis) reaction of alkenes according to a scheme as shown in FIG. 1.

Acyclic diene metathesis (or ADMET) is catalyzed by a great variety of transition metal complexes as well as non-metallic systems. Heterogeneous catalyst systems based on metal oxides, sulfides or metal salts were originally used for the metathesis of olefins. However, the limited stability (especially towards hetero-substituents) and the lack of selectivity resulting from the numerous active sites and side reactions are major drawbacks of the heterogeneous systems.

Homogeneous systems have also been devised and used to effect olefin metathesis. These systems offer significant activity and control advantages over the heterogeneous catalyst systems. For example, certain Rhodium based complexes are effective catalysts for the metathesis of electron-rich olefins.

The discovery that certain metal-alkylidene complexes are capable of catalyzing the metathesis of olefins triggered the development of a new generation of well-defined, highly active, single-site catalysts. Amongst these, Bis-(tricyclohexylphosphine)-benzylidene ruthenium dichloride (commonly know as Grubb's catalyst) has been widely used, due to its remarkable insensitivity to air and moisture and high tolerance towards various functional groups. Unlike the molybdenum-based metathesis catalysts, this ruthenium carbene catalyst is stable to acids, alcohols, aldehydes and quaternary amine salts and can be used in a variety of solvents ($C_6H_6$, $CH_2Cl_2$, THF, t-BuOH).

The use of transition-metal catalyzed alkene metathesis has since enjoyed increasing attention as a synthetic method. The most commonly used catalysts are based on Mo, W and Ru. Research efforts have been mainly focused on the synthesis of small molecules, but the application of olefin metathesis to polymer synthesis has allowed the preparation of new polymeric material with unprecedented properties (such as highly stereoregular poly-norbornadiene).

Figure 2:
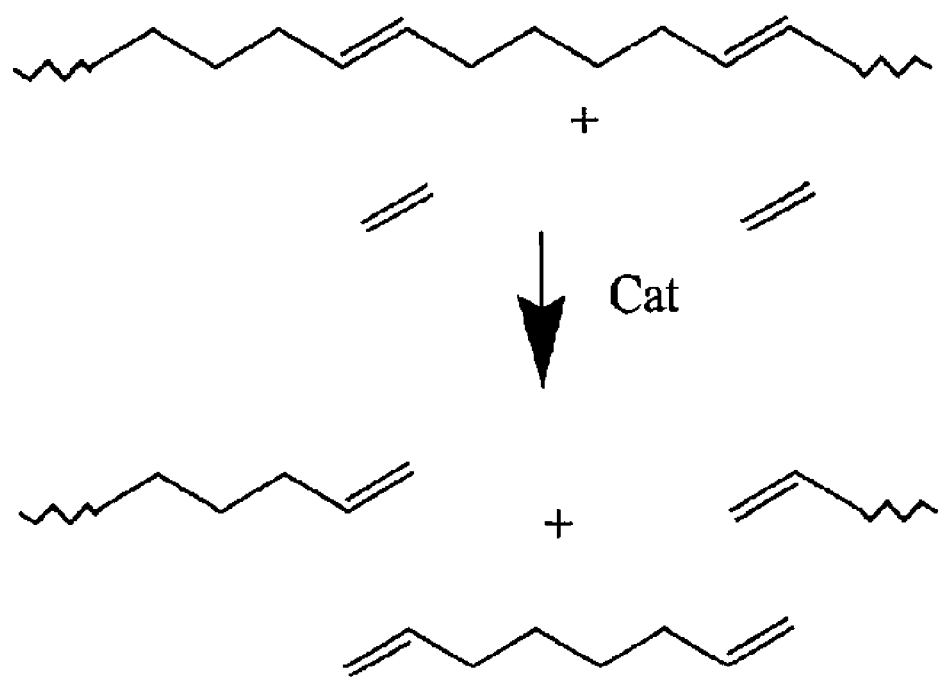

The utilization of olefin metathesis as a means to produce low molecular weight compounds from unsaturated elastomers has received growing interest. The principle for the molecular weight reduction of unsaturated polymers is shown in FIG. 2. The use of an appropriate catalyst allows the cross-metathesis of the unsaturation of the polymer with the co-olefin. The end result is the cleavage of the polymer chain at the unsaturation sites and the generation of polymer fragments having lower molecular weights. In addition, another effect of this process is the "homogenizing" of the polymer chain lengths, resulting in a reduction of the polydispersity. From an application and processing stand point, a narrow molecular weight distribution of the raw polymer results in improved physical properties of the vulcanized rubber, while the lower molecular weight provides good processing behavior.

The so-called "depolymerization" of copolymers of 1,3-butadiene with a variety of co-monomers (styrene, propene, divinylbenzene and ethylvinylbenzene, acrylonitrile, vinyl-trimethylsilane and divinyldimethylsilane) in the presence of classical Mo and W catalyst system has been investigated. Similarly, the degradation of a nitrile rubber using $WCl_6$ and $SnMe_4$ or $PhC\equiv CH$ co-catalyst was reported in 1988. However, the focus of such research was to produce only low molecular fragments, which could be characterized by conventional chemical means and contains no teaching with respect to the preparation of low molecular weight nitrile rubber polymers. Furthermore, such processes are non-controlled and produce a wide range of products.

The catalytic depolymerization of 1,4-polybutadiene in the presence of substituted olefins or ethylene (as chain transfer agents) in the presence of well-defined Grubb's or Schrock's catalysts is also possible. The use of Molybdenum or Tungsten compounds of the general structural formula $\{M(=NR_1)(OR_2)_2(=CHR); M=Mo, W\}$ to produce low molecular weight polymers or oligomers from gelled polymers containing internal unsaturation along the polymer backbone was claimed in U.S. Pat. No. 5,446,102. Again, however, the process disclosed is non-controlled, and there is no teaching with respect to the preparation of low molecular weight nitrile rubber polymers.

SUMMARY OF THE INVENTION

It has been discovered that a low molecular weight nitrile rubber having narrower molecular weight distributions than those known in the art can be prepared by olefin metathesis. Rubbers having a narrow molecular weight distribution have certain advantages over those having a broad molecular weight distribution, one of these being that they have improved physical properties, resulting, for example, in better processability of the rubber.

Thus, the present invention is directed to a nitrile rubber having a molecular weight ($M_w$) in the range of from 25,000 to 200,000 g/mol, a Mooney viscosity (ML 1+4@100 deg. C.) of less than 25, and a MWD (or polydispersity index) of less than 2.5.

The present invention is also directed to a process for the preparation of said nitrile rubber. The process includes subjecting said nitrile rubber to a metathesis reaction in the presence of at least one co-olefin and at least one compound selected from the group consisting of compounds of the general formulas I, II, III or IV,

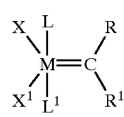

Formula I wherein:
M is Os or Ru;
R and $R^1$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl;
X and $X^1$ are independently any anionic ligand; and
L and $L^1$ are independently any neutral ligand; optionally, L and $L^1$ can be linked to one another to from a bidentate neutral ligand;

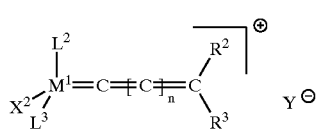

Formula II wherein:
$M^1$ is Os or Ru;
$R^2$ and $R^3$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl;
$X^2$ is a anionic ligand; and
$L^2$ is a neutral π-bonded ligand, preferably but not limited to arene, substituted arene, heteroarene, independent of whether they are mono- or polycyclic;
$L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines;
$Y^-$ is a non-coordinating anion;
n is an integer in the range of from 0 to 5;

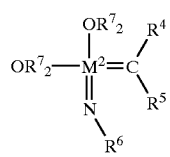

Formula III wherein
$M^2$ is Mo or W
$R^4$, $R^5$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl;
$R^6$ and $R^7$ are independently selected from any unsubstituted or halo-substituted alkyl, aryl, aralkyl groups or silicon-containing analogs thereof;

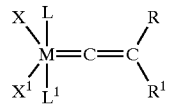

Formula IV wherein
M is Os or Ru;
R and $R^1$ are independently selected from the group consisting of hydrogen, substituted or unsubstituted alkyl, and substituted or unsubstituted alkyl
X and $X^1$ are independently any anionic ligand; and
L an $L^1$ are independently any neutral ligand.

The present invention is also directed to the use of said nitrile rubber for the manufacture of a shaped article, such as a seal, hose, bearing pad, stator, well head seal, valve plate, cable sheathing, wheel, roller, pipe seal or footwear component.

DETAILED DESCRIPTION OF THE INVENTION

As used throughout this specification, the term "nitrile rubber" is intended to have a broad meaning and is meant to encompass a copolymer having repeating units derived from at least one conjugated diene, at least one α,β-unsaturated nitrile and optionally further one or more copolymerizable monomers.

The conjugated diene may be any known diene, preferably a $C_4$–$C_6$ conjugated diene. Preferred conjugated dienes include butadiene, isoprene, piperylene, 2,3-dimethyl butadiene or mixtures thereof. More preferred $C_4$–$C_6$ conjugated diene include butadiene, isoprene and mixtures thereof. The most preferred $C_4$–$C_6$ conjugated diene is butadiene.

The α,β-unsaturated nitrile may be any known α,β-unsaturated nitrile, preferably a $C_3$–$C_5$-α,β-unsaturated nitrile. Preferred $C_3$–$C_5$ α,β-unsaturated nitriles include acrylonitrile, methacrylonitrile, ethacrylonitrile or mixtures thereof. The most preferred $C_3$–$C_5$ α,β-unsaturated nitrile is acrylonitrile.

Preferably, the copolymer contains in the range of from 40 to 85 weight percent of repeating units derived from one or more conjugated dienes and in the range of from 15 to 60 weight percent of repeating units derived from one or more α,β-unsaturated nitriles. More preferably, the copolymer contains in the range of from 60 to 75 weight percent of repeating units derived from one or more conjugated dienes and in the range of from 25 to 40 weight percent of repeating units derived from one or more α,β-unsaturated nitriles. Most preferably, the copolymer contains in the range of from 60 to 70 weight percent of repeating units derived from one or more conjugated dienes and in the range of from 30 to 40 weight percent of repeating units derived from one or more α,β-unsaturated nitriles.

Optionally, the copolymer may further contain repeating units derived from one or more copolymerizable monomers, such as unsaturated carboxylic acids. Non-limiting examples of suitable unsaturated carboxylic acids include fumaric acid, maleic acid, acrylic acid, methacrylic acid and mixtures thereof. Repeating units derived from one or more copolymerizable monomers will replace either the nitrile or the diene portion of the nitrile rubber and it will be apparent to the skilled in the art that the above mentioned weight percents will have to be adjusted to result in 100 weight percent. In case of the mentioned unsaturated carboxylic acids, the nitrile rubber preferably contains repeating units derived from one or more unsaturated carboxylic acids in the range of from 1 to 10 weight percent of the copolymer, with this amount displacing a corresponding amount of the conjugated diolefin.

Other preferred optionally further monomers are unsaturated mono- or di-carboxylic acids or derivatives thereof (e.g., esters, amides and the like) including mixtures thereof.

The process of the present invention is conducted in the presence of one or more compounds of the general formulas I, II, III or IV,

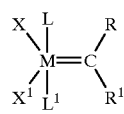

Formula I wherein

M is Os or Ru;

R and $R^1$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl;

X and $X^1$ are independently any anionic ligand; and

L and $L^1$ are independently any neutral ligand, such as phosphines, amines, thioethers or imidazolidines or any neutral carbine, optionally, L and $L^1$ can be linked to one another to from a bidentate neutral ligand;

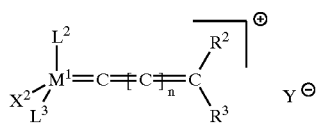

Formula II wherein $M^1$ is Os or Ru;

$R^2$ and $R^3$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl;

$X^2$ is a anionic ligand; and $L^2$ is a neutral π-bonded ligand, preferably arene, substituted arene, heteroarene, independent of whether they are mono- or polycyclic;

$L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines;

$Y^-$ is a non-coordinating anion;

n is an integer in the range of from 0 to 5;

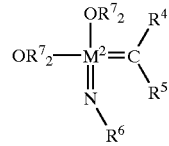

Formula III wherein $M^2$ is Mo or W $R^4$, $R^5$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$ –$C_{20}$ alkylsulfinyl;

$R^6$ and $R^7$ are independently selected from any unsubstituted or halo-substituted alkyl, aryl, aralkyl groups or silicon-containing analogs thereof;

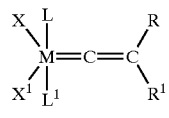

Formula IV wherein

M is Os or Ru;

R and $R^1$ are independently selected from the group consisting of hydrogen, substituted or unsubstituted alkyl, and substituted or unsubstituted alkyl X and $X^1$ are independently any anionic ligand; and L and $L^1$ are independently any neutral ligand, such as phosphines, amines, thioethers or imidazolidines or any neutral carbine, optionally, L and $L^1$ can be linked to one another to from a bidentate neutral ligand.

Compounds of Formula I are preferred. Compounds of Formula I wherein L and $L^1$ are trialkylphosphines, X and $X^1$ are chloride ions and M is Ruthenium are more preferred.

The amount of compounds will depend upon the nature and catalytic activity of the compound(s) in question. Typically, the ratio of compound(s) to NBR is in the range of from 0.005 to 5, preferably in the range of from 0.025 to 1 and, more preferably, in the range of from 0.1 to 0.5.

The metathesis reaction is carried out in the presence of a co-olefin, which is a $C_1$ to $C_{16}$ linear or branched olefin such as ethylene, isobutene, styrene or 1-hexene. Where the co-olefin is a liquid (such as 1-hexene), the amount of co-olefin employed is preferably in the range of from 1 to 200 weight %. Where the co-olefin is a gas (such as ethylene), the amount of co-olefin employed is such that it results in a pressure in the reaction vessel in the range of from $1 \times 10^5$ Pa to $1 \times 10^7$ Pa, preferably in the range of from $5.2 \times 10^5$ Pa to $4 \times 10^6$ Pa.

The metathesis reaction can be carried out in any suitable solvent, which does not inactivate the catalyst or otherwise interfere with the reaction. Preferred solvents include, but are not limited to, dichloromethane, benzene, toluene, tetrahydrofuran, cylcohexane and the like. The more preferred solvent is monochlorobenzene (MCB). In certain cases the co-olefin can itself act as a solvent (for example, 1-hexene), in which case no other solvent is necessary.

The concentration of NBR in the reaction mixture is not critical but, should be such that the reaction is not hampered if the mixture is too viscous to be stirred efficiently, for example. Preferably, the concentration of NBR is in the range of from 1 to 20% by weight, more preferably in the range of from 6 to 15% by weight.

The process of the present invention usually is carried out at a temperature in the range of from 20 to 140° C.; preferably in the range of from 60 to 120° C.

The reaction time will depend upon a number of factors, including cement concentration, amount of catalyst used and the temperature at which the reaction is performed. The metathesis usually is complete within the first two hours under typical conditions. The progress of the metathesis reaction may be monitored by standard analytical techniques, for example using GPC or solution viscosity. Whenever referenced throughout the specification the molecular weight distribution of the polymer was determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The Mooney viscosity of the rubber was determined using ASTM test D1646.

The nitrile rubber of the present invention is very well suited for the manufacture of a shaped article, such as a seal, hose, bearing pad, stator, well head seal, valve plate, cable sheathing, wheel, roller, pipe seal or footwear component.

EXAMPLES

Examples 1–4

Bis(tricyclohexylphosphine)benzylidene ruthenium dichloride (Grubb's metathesis catalyst), 1-hexene and monochlorobenzene (MCB) were purchased from Alfa, Aldrich Chemicals, and PPG respectively and used as received.

The metathesis reactions were carried out in a Parr high-pressure reactor under the following conditions:

| | |
|---|---|
| Cement Concentration | 6 or 15% by weight |
| Co-Olefin | Ethylene or 1-Hexene |
| Co-Olefin Concentration | see Table 1 |
| Agitator Speed | 600 rpm |
| Reactor Temperature | see Table 1 |
| Catalyst Loading | see Table 1 |
| Solvent | Monochlorobenzene |
| Substrate | statistical Butadiene-acrylonitrilecopolymer with a acrylonitrile content of 34 mol % and a Mooney-Viscosity ML (1 + 4) @ 100 deg. C. of 35 |

The reactor was heated to desired temperature and 60 mL of a monochlorobenzene solution containing Grubb's catalyst was added to the reactor. The reactor was pressurized to the desired ethylene pressure for Examples 1–3 or to 100 psi of Nitrogen for Example 4. The temperature was maintained constant for the duration of the reaction. A cooling coil connected to a temperature controller and a thermal sensor was used to regulate the temperature. The progress of the reaction was monitored using solution viscosity measurements for the 6% cements. At higher cement concentration, the reaction was assumed to be complete after 18 hours.

Example 1

Details 75 g of rubber was dissolved in 1175 g of MCB (6 wt.-% solid). The cement was then charged to the reactor and degassed 3 times with $C_2H_4$ ($6.9 \times 10^5$ Pa) under full agitation.

Example 2

Details 200 g of rubber was dissolved in 1133 g of MCB (15 wt.-% solid). The cement was then charged to the reactor and degassed 3 times with $C_2H_4$ ($6.9 \times 10^5$ Pa) under full agitation.

Example 3

Details 450 g of rubber was dissolved in 2550 g of MCB (15 wt.-% solid). The cement was then charge d to the reactor and degassed 3 times with $C_2H_4$ ($6.9 \times 10^5$ Pa) under full agitation.

Example 4

Details 75 g of rubber was dissolved in 1175 g of MCB (6 wt.-% solid). The cement was then charged to the reactor. 150 g of 1-hexene was added to the reactor and the mixture was degassed 3 times with dry $N_2$ under full agitation.

TABLE 1

Experimental Details

| | Example 1 | Example 2 | Example 3 | Example 4 |
|---|---|---|---|---|
| Cement Concentration | 6 | 15 | 15 | 6 |
| Co-olefin | $C_2H_4$ | $C_2H_4$ | $C_2H_4$ | 1-hexene |
| Co-olefin Concentration | 400 psi | 500 psi | 500 psi | 20 g |
| Reactor Temperature | 80° C. | 80° C. | 80° C. | 80° C. |
| Catalyst Load | 0.25 | 0.25 | 0.05 | 0.25 |

For a typical product the Mn is 30 kg/mole (compared to 85 kg/mole for the starting polymer) while the Mw is 55 kg/mole (compared to 300 kg/mole for the starting polymer). As can be seen from Table 2, however, higher molecular weights (Mw) can also be obtained by manipulation of the experimental conditions (for example by lowering the catalyst loading). As expected, the molecular weight distribution falls from 3.5 for the substrate (starting polymer) to 2.0 for the metathesized product. This is consistent with a more homogeneous range of polymer chain lengths and molecular weights.

A summary of the polymer properties for selected samples is shown in Table 2. The GPC results show up to a fivefold reduction in Mw and a narrowing of the polydispersity index to 2.0.

TABLE 2

Summary of Polymer Properties

| | MN | MW | MZ | PDI | Mooney Viscosity (ML 1 + 4 @ 100 deg. C.) |
|---|---|---|---|---|---|
| Substrate | 85000 | 296000 | 939000 | 3.50 | 35 |
| Experiment 1 | 27000 | 54000 | 92000 | 2.00 | 2.5 |
| Experiment 2 | 32000 | 66000 | 117000 | 2.06 | — |
| Experiment 3 | 71000 | 180000 | 455000 | 2.5 | |
| Experiment 4 | 40000 | 84000 | 154000 | 2.1 | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a nitrile rubber comprising the step of subjecting said nitrile rubber to a metathesis reaction in the presence of at least one co-olefin and at least one compound selected from the group consisting of compounds having the formula I, II, III or IV

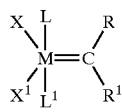

Formula I wherein

M is Os or Ru,

R and $R^1$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, X and $X^1$ are independently any anionic ligand, and L and $L^1$ are independently any neutral ligand; optionally, L and $L^1$ can be linked to one another to from a bidentate neutral ligand;

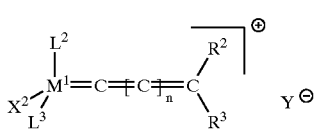

Formula II wherein $M^1$ is Os or Ru;

$R^2$ and $R^3$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, $X^2$ is an anionic ligand, $L^2$ is a neutral □-bonded ligand independent of whether they are mono- or polycyclic, $L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines, $Y^-$ is a non-coordinating anion, n is an integer in the range of from 0 to 5;

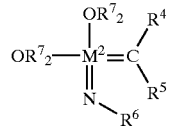

Formula III wherein $M^2$ is Mo or W, $R^4$, $R^5$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, $R^6$ and $R^7$ are independently any unsubstituted or halo-substituted alkyl, aryl, aralkyl groups or silicon-containing analogs thereof,

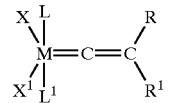

Formula IV wherein

M is Os or Ru,

R and $R^1$ are independently selected from the group consisting of hydrogen, substituted or unsubstituted alkyl, and substituted or unsubstituted alkyl, X and $X^1$ are independently any anionic ligand and L and $L^1$ are independently any neutral ligand.

2. A process according to claim 1 wherein a compound of Formula I is present.

3. A process according to claim 2 wherein L and $L^1$ are trialkylphosphines, X and $X^1$ are chloride ions and M is ruthenium.

4. A process according to claim 1 wherein the co-olefin(s) is a $C_2$ to $C_{16}$ linear or branched olefin(s).

5. A process according to claim 4 wherein the co-olefin is selected from the group consisting of ethylene and 1-hexene.

6. A process according to claim 1 wherein the process is carried out in an inert solvent selected from the group consisting of monochlorobenzene, dichloromethane, benzene, toluene, tetrahydrofuran, methyl ethyl ketone and cyclohexane.

7. A process according to claim 1 wherein the nitrile rubber is present in a concentration in the range of from 1 to 40% by weight.

* * * * *